United States Patent
Arita

(10) Patent No.: US 10,999,451 B2
(45) Date of Patent: May 4, 2021

(54) IMAGE FORMING APPARATUS, COMPUTER-READABLE RECORDING MEDIUM, AND IMAGE FORMING SYSTEM

(71) Applicant: Shunsuke Arita, Tokyo (JP)

(72) Inventor: Shunsuke Arita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 16/273,036

(22) Filed: Feb. 11, 2019

(65) Prior Publication Data

US 2019/0253566 A1 Aug. 15, 2019

(30) Foreign Application Priority Data

Feb. 15, 2018 (JP) .............................. JP2018-025500

(51) Int. Cl.
*H04N 1/00* (2006.01)
*H04N 1/60* (2006.01)
*G06F 3/12* (2006.01)

(52) U.S. Cl.
CPC ....... *H04N 1/00055* (2013.01); *G06F 3/1208* (2013.01); *G06F 3/1234* (2013.01); *H04N 1/00034* (2013.01); *H04N 1/6027* (2013.01); *H04N 1/6036* (2013.01)

(58) Field of Classification Search
None
See application file for complete search history.

(56) References Cited

U.S. PATENT DOCUMENTS

2005/0190386 A1 9/2005 Zaima
2016/0366306 A1* 12/2016 Tsukano ................ G06F 3/1273
2017/0075272 A1* 3/2017 Kimura .................. G03G 21/20

FOREIGN PATENT DOCUMENTS

| JP | 2005-189356 | | 7/2005 |
| JP | 2005189356 A | * | 7/2005 |
| JP | 2015-036709 | | 2/2015 |
| JP | 2017-013400 | | 1/2017 |

* cited by examiner

*Primary Examiner* — Fan Zhang
(74) *Attorney, Agent, or Firm* — Duft & Bornsen, PC

(57) ABSTRACT

Based on a correction value that is stored in a correction value storage, correcting circuitry corrects printing data that is acquired according to a printing instruction that is transmitted from a higher-level device. When an image forming unit determines, in response to reception of the printing instruction, that timing of reception of the printing instruction meets a given condition, the image forming unit suspends the printing instruction, requests the correcting circuitry to update the correction value, and forms an image based on the printing data that is corrected by the correcting circuitry. When the image forming unit requests the correcting circuitry to update the correction value, the correcting circuitry updates the correction value that is stored in the correction value storage based on the image that is formed by the image forming unit according to measurement pattern printing data that is stored in a measurement pattern storage.

8 Claims, 12 Drawing Sheets

IMAGE FORMING APPARATUS, COMPUTER-READABLE RECORDING MEDIUM, AND IMAGE FORMING SYSTEM

CROSS-REFERENCE TO RELATED APPLICATIONS

The present application claims priority under 35 U.S.C. § 119 to Japanese Patent Application No. 2018-025500, filed on Feb. 15, 2018. The contents of which are incorporated herein by reference in their entirety.

BACKGROUND OF THE INVENTION

1. Field of the Invention

The present invention relates to an image forming apparatus, a computer-readable recording medium, and an image forming system.

2. Description of the Related Art

It is known that, when an image forming apparatus is used for a long period, characteristics that relate to image formation in the image forming apparatus, such as the write laser output and the temperature at which toner is fixed, vary over time and this causes a deviation from an ideal printing concertation characteristic. A technology to correct the deviation is known, where a variation in the concentration of an image that is formed by an image forming apparatus is measured and, based on the result of the measurement, the printing concentration is automatically corrected on a page-by-page basis in a printing job to enable image formation at an appropriate concentration.

Japanese Unexamined Patent Application Publication No. 2005-189356 describes a technology to correct the printing concentration, using a correction table that is calculated from a variation in concentration in normal printing and, when the power is turned on, using a correction table that is prepared in advance for the time when the power is turned on. According to Japanese Unexamined Patent Application Publication No. 2005-189356, it is possible to perform image formation at an appropriate concentration in printing performed when the power is turned on.

In the system using the conventional technology to correct the concentration of an image to be formed on a page-by-page basis in a printing job, in sequential operations, it is possible to acquire a measured value of a variation in concentration and automatically correct the measured value appropriately. There is however a problem in that, when the characteristics that relate to image formation vary after a variation in concentration is measured, for example, when image formation operations are restarted after the image forming apparatus is left for a long time, it is difficult to perform image formation at an appropriate concentration. This problem has not been solved by the technology disclosed in Japanese Unexamined Patent Application Publication No. 2005-189356.

In view of the above-described circumstances, there is a need to enable appropriate image formation after a long time elapses from the last image formation operations.

SUMMARY OF THE INVENTION

According to an embodiment, an image forming apparatus includes correcting circuitry; a correction value storage that stores therein a correction value; and image forming unit that includes a measurement pattern storage that includes therein measurement pattern printing data. The correcting circuitry is configured to correct, based on the correction value, printing data that is acquired according to a printing instruction that is transmitted from a higher-level device. The image forming unit is configured to suspend the printing instruction, when the image forming unit determines, in response to reception of the printing instruction, that timing of reception of the printing instruction meets a given condition, request the correcting circuitry to update the correction value, and form an image based on the printing data that is corrected by the correcting circuitry. When the image forming unit requests the correcting circuitry to update the correction value, the correcting circuitry updates the correction value that is stored in the correction value storage based on the image that is formed by the image forming unit according to the measurement pattern printing data.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
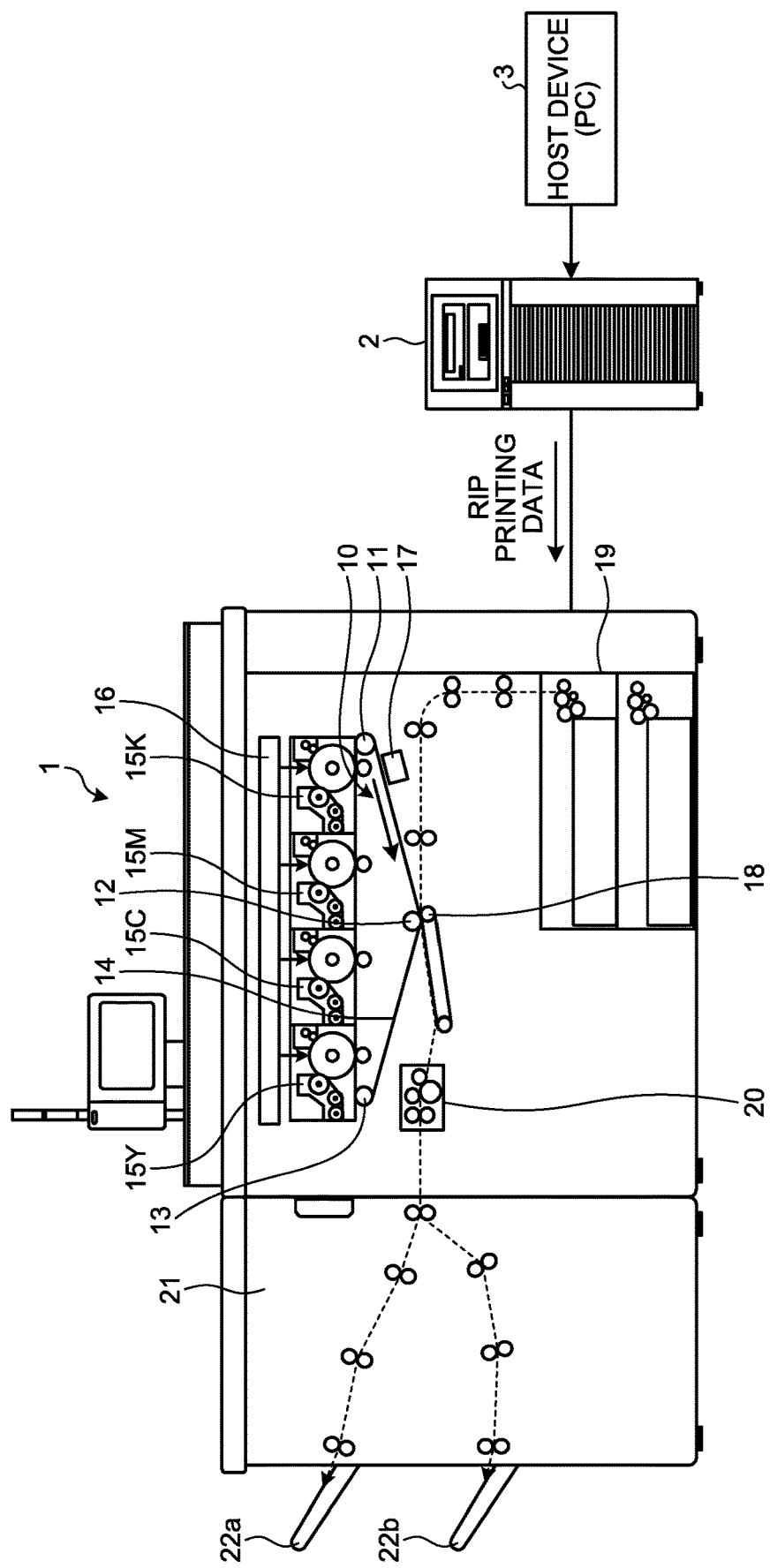
FIG. 1 is a diagram of an exemplary image forming system that is applicable to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of an image forming apparatus, a control program, and an image forming system will be described in detail below with reference to the accompanying drawings. FIG. 1 is a diagram of an image forming system applicable to the embodiment.

According to FIG. 1, the image forming system includes an image forming apparatus 1 and a higher-level device 2. The higher-level device 2 is, for example, a print server and has a wired connection with the image forming apparatus 1. The higher-level device 2 is referred to as a digital front end (DFE) and functions as an external printer controller that controls operations of the image forming apparatus 1 from outside. A host device 3 is, for example, a personal computer (PC) that creates a printing job to print a document and transmits the created printing job to the higher-level device 2. The printing job can contain printing setting for and printing data on a plurality of pages. The printing data contains image data for forming an image.

On receiving the print job from the host device 3, the higher-level device 2 performs image processing on the printing data according to the printing setting that is specified in the printing job and furthermore performs a loading process (raster image processor (RIP) process) on the printing data on which the image processing has been performed. The higher-level device 2 includes a transmitter that transmits data to the image forming apparatus 1 and the transmitter transmits the printing data (RIP printing data) on which the loading process has been performed to the image forming apparatus 1. In other words, the printing data contains the image data for forming the image. According to the printing setting made by the user, the image forming apparatus 1 executes the printing process based on the printing data that is transferred from the higher-level device 2.

The image forming apparatus 1 includes a transfer operation unit 10. The transfer operation unit 10 includes a drive roller 11, a secondary transfer backup roller 12, a driven roller 13, and an intermediate transfer belt 14 that is wound around the drive roller 11, the secondary transfer backup roller 12, and driven roller 13. The image forming apparatus 1 further includes cartridges 15Y, 15C, 15M and 15K of colors of Y (yellow), C (cyan), M (magenta) and K (black) that are arranged such that the cartridges 15Y, 15C, 15M and 15K are opposed to the intermediate transfer belt 14. The cartridges 15Y, 15C, 15M and 15K have photoconductors, respectively, on which toner images of different colors are formed. Each of the cartridges 15Y, 15C, 15M and 15K includes a charging roller.

In each of the cartridges 15Y, 15C, 15M and 15K, a voltage with which the discharging roller is charged is applied to the surface of the photoconductor and the surface of the photoconductor is charged to have a given polarity. Laser light that is emitted from an optical write device 16 is applied to the charged photoconductor so that an electrostatic latent image is formed. Toner is adhered to the electrostatic latent image that is formed on the photoconductor so that a toner image is formed. Each of the toner images that are formed on the respective photoconductors is primarily transferred onto the intermediate transfer belt 14. As described above, the intermediate transfer belt 14 is one of the members on which images are formed.

The toner image that is formed on the intermediate transfer belt 14 is read by a sensor 17 before being secondarily transferred onto a printing medium. The sensor 17, for example, includes a light emitter and a light receiver. The light receiver receives reflection light resulting from reflection of light that is emitted by the light emitter from the toner image, which is primarily transferred onto the intermediate transfer belt 14, to read the toner image. By measuring the intensity of the light received by the sensor 17, it is possible to acquire a concentration measured value of the toner image that is read.

After the sensor 17 reads the toner image, the printing medium is conveyed from a paper feeding device 19 so that the printing medium is between the intermediate transfer belt 14 that is wound around the secondary transfer backup roller 12 and a secondary transfer roller 18 that is arranged such that the secondary transfer roller 18 is opposed to the intermediate transfer belt 14. A given voltage is applied to the secondary transfer roller 18 and the toner image on the intermediate transfer belt 14 is secondarily transferred onto the printing medium, such as printing paper. The printing medium is also one of members on which an image is formed. The printing medium onto which the toner image has been secondarily transferred passes through a fixing device 20, where the toner image on the printing medium is fixed to the printing medium by heat and pressure, and is then conveyed to a paper ejection device 21.

The paper ejection device 21 includes paper ejection trays 22a and 22b in the example illustrated in FIG. 1. The paper ejection device 21 outputs the printing medium that is transferred from the fixing device 20 to any specified one of the paper ejection trays 22a and 22b.

Figure 2:
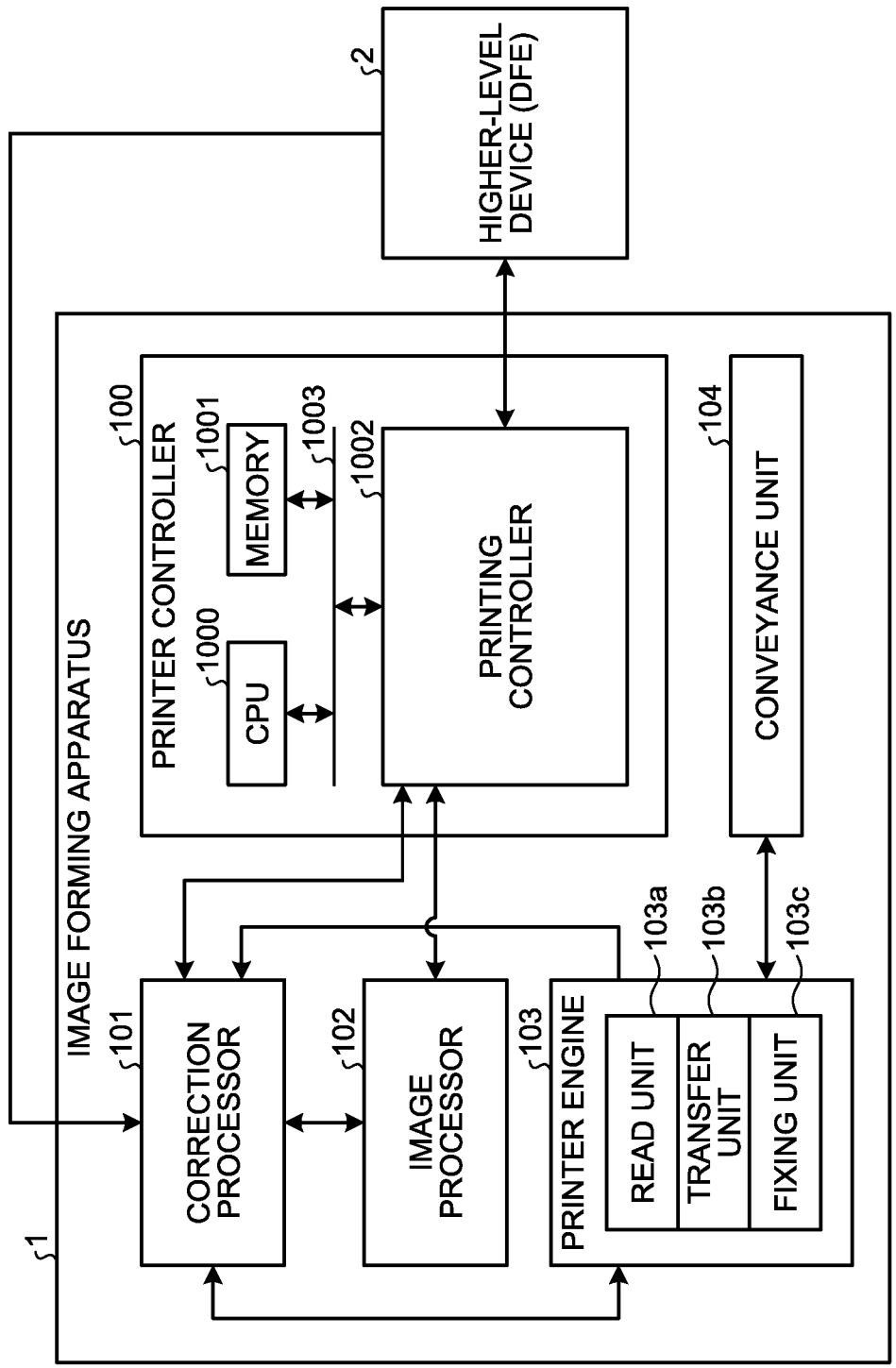
FIG. 2 is a block diagram of a configuration of an exemplary image forming apparatus applicable to the embodiment.

FIG. 2 is a block diagram of a configuration of the exemplary image forming apparatus 1 applicable to the embodiment. As illustrated in FIG. 2, the image forming apparatus 1 includes a printer controller 100, a correction processor 101, an image processor 102, a printer engine 103, and a conveyance unit 104.

The printer controller 100 includes a central processing unit (CPU) 1000, a memory 1001, and a printing controller 1002 that are connected with one another via a bus 1003. The memory 1001, for example, contains a read only memory (ROM) area and a random access memory (RAM) area. In the ROM area, a control program that is executed by the CPU 1000 is stored in advance. In the RAM area, the printing data and control information that are received from the higher-level device 2 are stored.

The printing controller 1002 includes control I/Fs respectively for connection with the correction processor 101, the image processor 102 and the higher-level device 2. The printing controller 1002 is controlled by the CPU 1000 according to the control program and communicates with the correction processor 101 and the image processor 102 via the control I/Fs to control entire printing performed by the image forming apparatus 1.

The printer engine 103 is an image forming unit that performs a process of forming an image on a printing medium. The printer engine 103 includes a read unit 103a, a transfer unit 103b, and a fixing unit 103c. The read unit 103a includes the sensor 17 and a measurement unit that measures the concentration of the toner image based on an output of the sensor 17. The transfer unit 103b corresponds to the above-described transfer operation unit 10, further includes cartridges 15Y to 15K, and transfers the image based on the printing data onto the printing medium. The fixing unit 103*c* corresponds to the above-described fixing device 20.

The printer engine 103, for example, includes a timer and a memory and stores, in a memory, a log in which at least a given operation of the transfer unit 103*b* among the read unit 103*a*, the transfer unit 103*b* and the fixing unit 103*c* is associated with a time that is measured with a timer. The printer engine 103 may acquire the time that is measured by the timer of the CPU 1000.

The correction processor 101 receives the printing data after loading processing from the higher-level device 2 and, based on a concentration measured value that is measured by the read unit 103*a*, performs an appropriate concentration correction process on the printing data according to the current condition of the image forming apparatus 1. The correction processor 101 transfers the printing data on which the concentration correction process has been performed to the image processor 102. The image processor 102 performs given image processing, such as edge processing, on the printing data that is received from the correction processor 101 to generate printing data for laser writing. The image processor 102 includes a buffer memory 102*a* and accumulatively stores the generated printing data in the buffer memory 102*a*.

The printer engine 103 determines whether to execute the concentration correction process when performing an image formation process. When it is determined to perform the concentration correction process, the printer engine 103 transfers, to the correction processor 101, the concentration measured value that is measured by the read unit 103*a* based on the result of the reading by the sensor 17 from the toner image that is formed on the intermediate transfer belt 14.

The conveyance unit 104 controls conveyance of the printing medium. More specifically, the conveyance unit 104 controls conveyance of the printing medium from the paper feeding device 19 to the fixing device 20. The conveyance unit 104 also performs control on driving the intermediate transfer belt 14. Furthermore, the conveyance unit 104 performs control on a route in which the printing medium is ejected in the paper ejection device 21.

Figure 3:
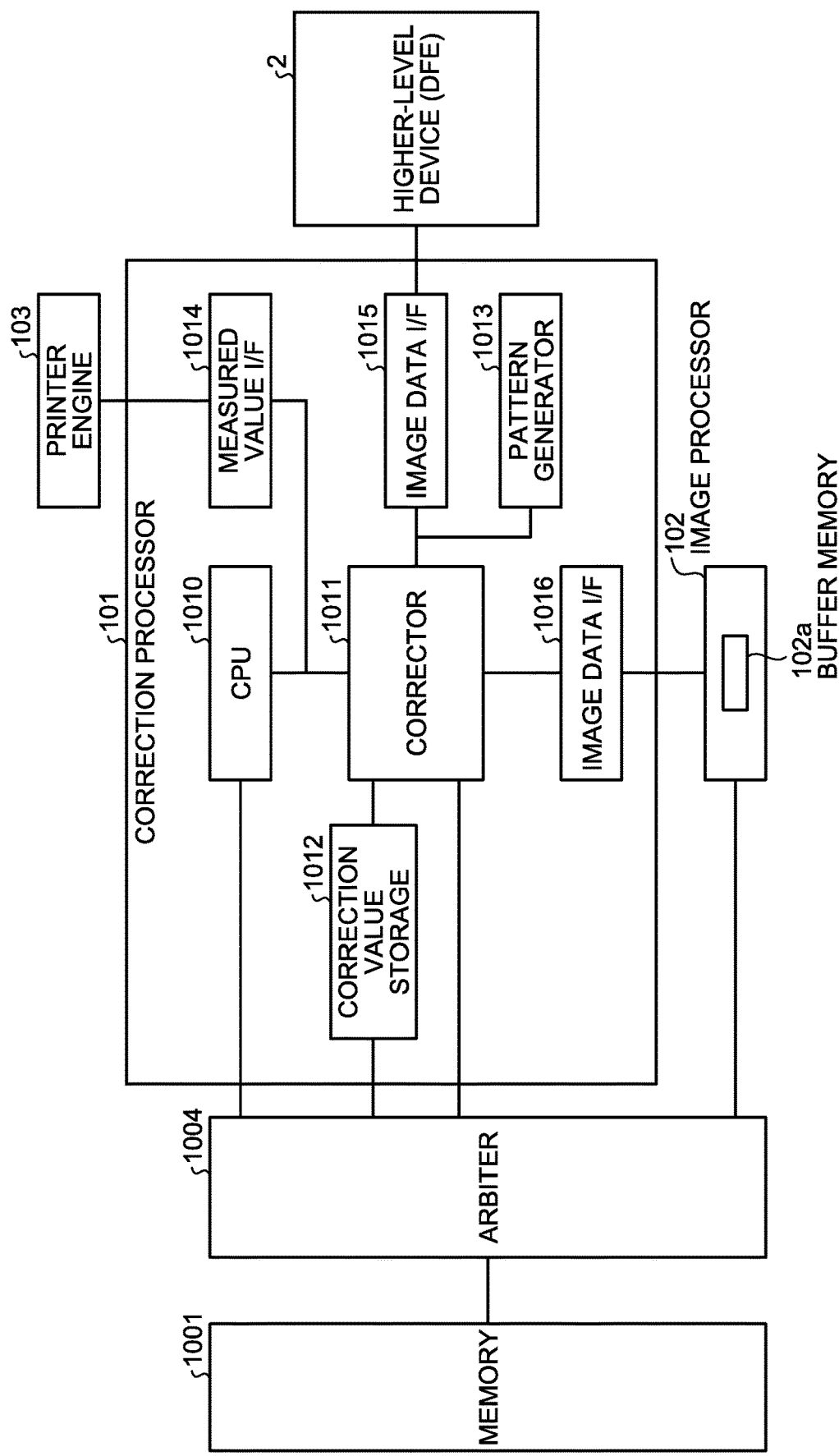
FIG. 3 is a block diagram of a configuration of an exemplary correction processor applicable to the embodiment.

FIG. 3 is a block diagram of a configuration of the exemplary correction processor 101 applicable to the embodiment. The components in FIG. 3 corresponding to those in FIG. 2 are denoted with the same reference numbers as those in FIG. 2 and detailed descriptions thereof will be omitted.

According to FIG. 3, the correction processor 101 includes a CPU 1010, a corrector 1011, a correction value storage 1012, and a pattern generator 1013. The correction processor 101 further includes interfaces including a measured value interface (I/F) 1014 and image data I/Fs 1015 and 1016.

An arbiter 1004 is contained in the above-described printing controller 1002 and adjusts data transfer between the memory 1001 and the correction processor 101 and between the memory 1001 and the image processor 102. The memory 1001 stores the concentration measured value that is received from the correction processor 101 via the arbiter 1004 and a concentration correction value, which will be described below. The memory 1001 stores the program to control entire operations of the correction processor 101, which is the program containing a program to calculate the concentration correction value from the concentration measured value. The program is, for example, configured as a module of the control program to control the image forming apparatus 1. The memory 1001 further stores the printing data if required when, for example, image processing is performed based on information on neighboring pixels surrounding a pixel of interest as in matrix processing. For example, the image processor 102 reads the printing data from the memory 1001 via the arbiter 1004 and performs the image processing.

The CPU 1010 controls entire operations of the correction processor 101 according to the program that is stored in the memory 1001 and the CPU 1010 is controllable by an external device, such as the printer controller 100 or the printer engine 103.

For example, when making a specified number of prints is executed or when the concentration measured value exceeds a specified threshold, a notification indicating that a condition for performing correction on the concentration is met is transmitted from the printer engine 103 to the CPU 1010 via that measured value I/F 1014. On receiving the notification, the CPU 1010 acquires the concentration measured value to update the correction value and calculates a new correction value corresponding to the current printing concentration characteristics. The CPU 1010 stores the calculated new correction value in the memory 1001 via the arbiter 1004.

The correction value storage 1012 includes a buffer memory and reads the correction value that is stored in the memory 1001 and stores the correction value in the buffer memory. Accordingly, the correction value that is stored in the correction value storage 1012 is updated to a new correction value. The correction value storage 1012 is able to update the correction value by, for example, rewriting the correction value that is stored in the memory 1001 with a new correction value.

Based on the correction value that is stored in the correction value storage 1012, the corrector 1011 performs the concentration correction process, such as gamma processing and intermediate tone processing, on the printing data that is received from the higher-level device 2. The corrector 1011 transfers the printing data on which the concentration correction process has been performed to the image processor 102 via the image data I/F 1016.

When the correction value is updated, the pattern generator 1013 generates measurement pattern printing data for forming a measurement pattern according to pattern data for measuring a concentration and passes the measurement pattern printing data to the corrector 1011. The corrector 1011 transmits measurement pattern printing data that is generated by the pattern generator 1013 to the printer engine 103 via the measured value I/F 1014. According to the measurement pattern printing data, the printer engine 103 forms a toner image of the measurement pattern on the intermediate transfer belt 14.

For example, the measurement pattern is a pattern obtained by arranging gradation patterns of colors of Y, C, M and K where the concentration varies in a drive direction parallel to direction in which the intermediate transfer belt 14 is driven in a direction perpendicular to the drive direction. The measurement pattern is, for example, formed on the intermediate transfer belt 14 in a space between printing media, which is a space set wider than usual.

The read unit 103*a* reads the toner image of the measurement pattern with the sensor 17 and performs concentration measurement. After being read by the sensor 17, the toner image is cleaned and removed from the intermediate transfer belt 14 so as not to be secondarily transferred onto the printing medium.

When communicating with each external device (the image processor 102, the printer engine 103, etc.,), the correction processor 101 is able to transfer data containing control information to each external device via each I/F (the image data I/Fs 1015 and 1016 and the measured value I/F 1014). Alternatively, an I/F dedicated to transmission and reception of control information may be provided in the correction processor 101 to transfer the control information via the dedicated I/F.

Figure 4:
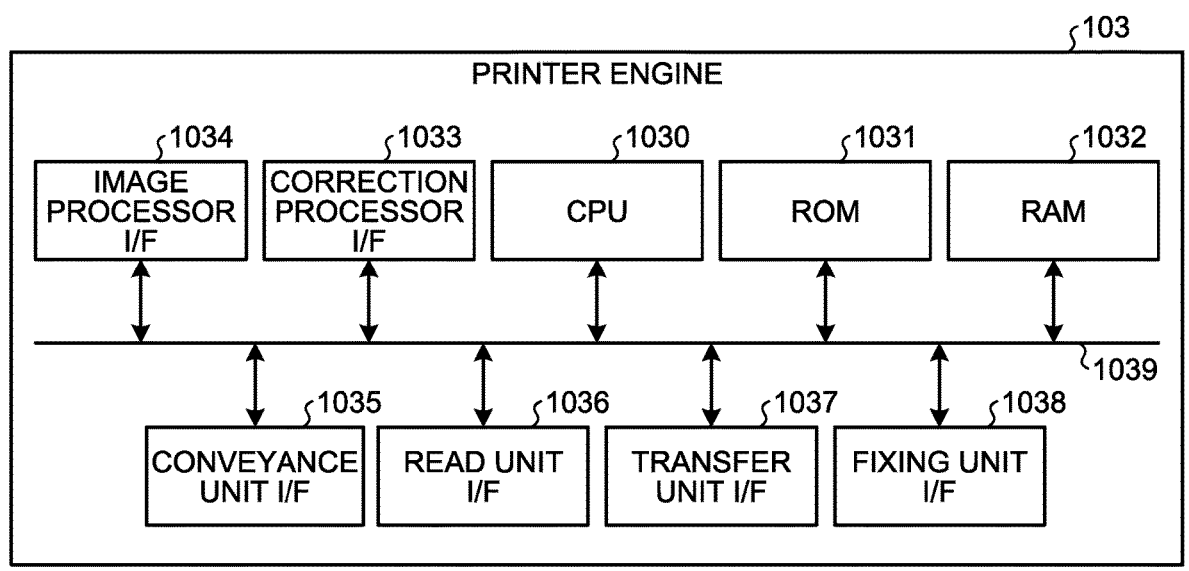
FIG. 4 is a block diagram of a configuration of an exemplary printer engine applicable to the embodiment.

FIG. 4 is a block diagram of a configuration of the exemplary printer engine 103 applicable to the embodiment. As illustrated in FIG. 4, the printer engine 103 includes a CPU 1030, a ROM 1031, a RAM 1032, a correction processor I/F 1033, an image processor I/F 1034, a conveyance unit I/F 1035, a read unit I/F 1036, a transfer unit I/F 1037, and a fixing unit I/F 1038 that are communicable with one another via a bus 1039.

Using the RAM 1032 as a work memory, the CPU 1030 controls entire operations of the printer engine 103 according to a program that is stored in advance in the ROM 1031 in advance. For example, control on the read unit 103*a*, the transfer unit 103*b* and the fixing unit 103*c* that the printer engine 103 includes is realized by the program that runs on the CPU 1030.

The correction processor I/F 1033 is an interface for the correction processor 101. The correction processor I/F 1033 transfers the concentration measured value of the concentration measurement pattern obtained in a way that the sensor 17 reads the measurement pattern and the read unit 103*a* measures the concentration. The printer engine 103 transmits and receives control information and status between the printer engine 103 and the printer controller 100 via the correction processor I/F 1033 and the correction processor 101. The image processor I/F 1034 is an interface for the image processor 102 and receives the printing data on which the image processing has been performed from the image processor 102.

The conveyance unit I/F 1035 is an interface to the conveyance unit 104. The printer engine 103 communicates with the conveyance unit 104 via the conveyance unit I/F 1035 to perform, for example, control on conveyance of the printing medium and reception of a result of detecting the position of the printing medium. The read unit I/F 1036, the transfer unit I/F 1037, and the fixing unit I/F 1038 are interfaces respectively for the sensor 17, the transfer operation unit 10, and the fixing device 20. The printer engine 103 controls the conveyance unit 104, the transfer operation unit 10 and the fixing device 20 via the conveyance unit I/F 1035, the read unit I/F 1036, the transfer unit I/F 1037 and the fixing unit I/F 1038, receives the output of the sensor 17, and performs the printing process and the concentration correction process.

Printing Process According to Existing Technology

Figure 5:
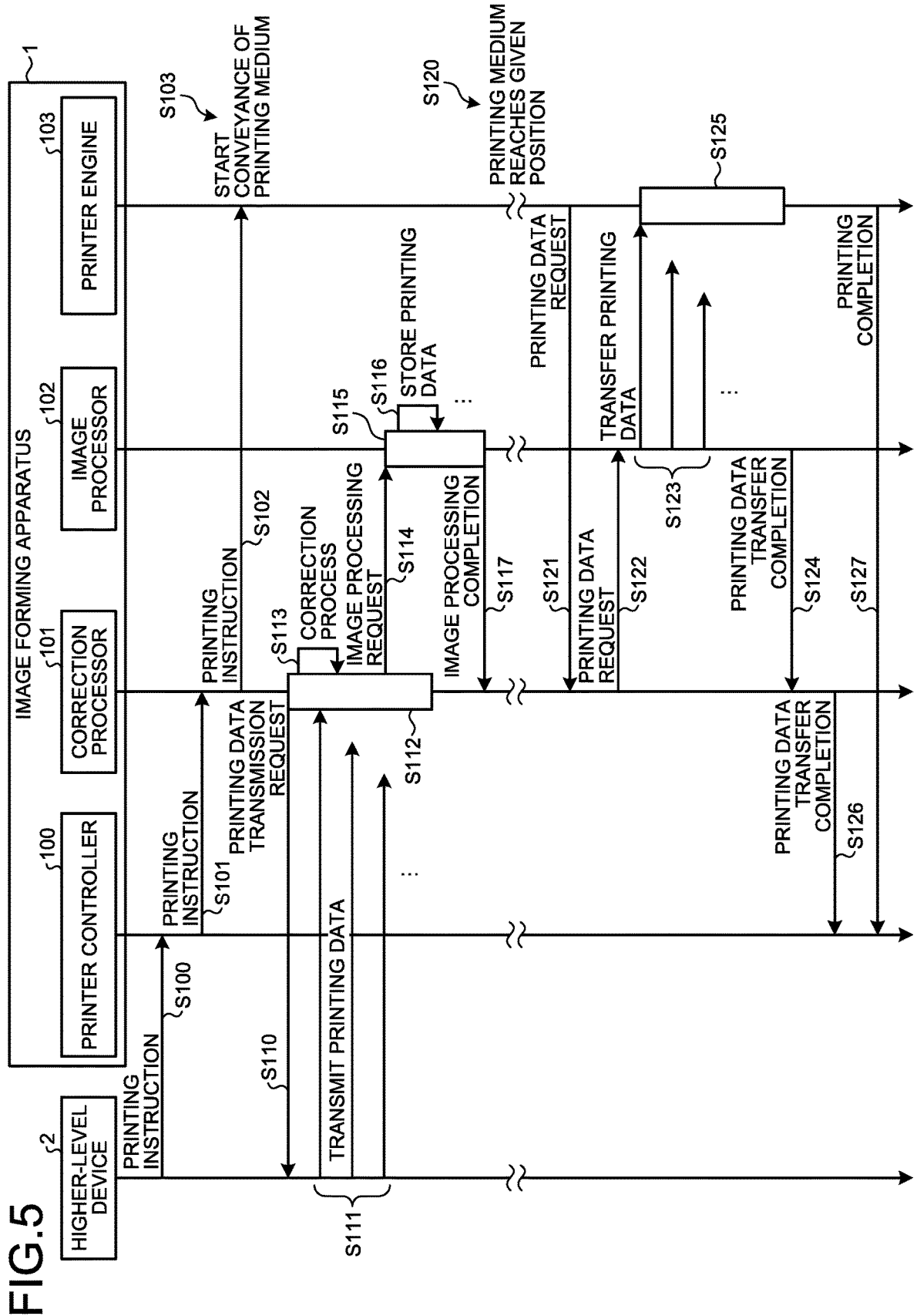
FIG. 5 is a sequence chart of exemplary operations of normal printing according to an existing technology.

Prior to the printing process according to the embodiment, for easy understanding, a printing process according to an existing technology will be described. FIG. 5 is a sequence chart of exemplary operations of normal printing according to the existing technology. The components in FIG. 5 and the following similar drawings (FIGS. 6 to 8) common to those in FIG. 2 are denoted with the same reference numbers as those in FIG. 2 and detailed descriptions thereof will be omitted.

At step S100, for example, in response to an instruction from the host device 3, the higher-level device 2 notifies the image forming apparatus 1 of an printing instruction. The higher-level device 2 notifies the image forming apparatus 1 of a printing instruction to perform printing based on printing data of a size of one of pages contained in a printing job. In the image forming apparatus 1, when the printing instruction is received from the higher-level device 2, the printer controller 100 notifies the correction processor 101 of the printing instruction (step S101). The correction processor 101 notifies the printer engine 103 of the printing instruction (step S102).

After notifying the printer engine 103 of the printing instruction at step S102, the correction processor 101 requests the higher-level device 2 to transmit printing data (step S110). The higher-level device 2 having received the request to transmit printing data transmits printing data to the correction processor 101 (step S111).

While sequentially receiving printing data from the higher-level device 2 (step S112), based on the correction value that is stored in the correction value storage 1012, the correction processor 101 performs the concentration correction process on the received printing data (step S113). The correction processor 101 transmits the printing data on which the concentration correction process has been performed to the image processor 102 and requests the image processor 102 to perform image processing (step S114). In response to the request, the image processor 102 performs image processing, such as edge processing, on the printing data that is received from the correction processor 101 (step S115) and accumulates the printing data on which the image processing has been performed in the internal buffer memory of the image processor 102 (step S116). On completing the image processing requested by the correction processor 101, the image processor 102 notifies the correction processor 101 of the completion (step S117).

On the other hand, on receiving the printing instruction at step S102, the printer engine 103 transmits a conveyance instruction to the conveyance unit 104 according to the content of the printing instruction to start conveyance of a printing medium from the paper feeding device 19 (step S103). On being notified that the printing medium conveyed from the conveyance unit 104 reaches a given position (step S120), the printer engine 103 notifies the correction processor 101 of a printing data request (step S121). The correction processor 101 having received the notification notifies the image processor 102 of the printing data request (step S122).

The image processor 102 sequentially transmits the printing data on which the image processing has been performed and that is accumulated at step S116 to the printer engine 103 (step S123). When transfer of the printing data that is requested by the correction processor 101 at step S122 (in the example, printing data of one page), the image processor 102 notifies the correction processor 101 of the completion (step S124).

When the transfer of the printing data from the image processor 102 is completed, the printer engine 103 performs printing on the printing medium based on the printing data (step S125). More specifically, the printer engine 103 forms an image on the intermediate transfer belt 14 based on the printing data. The image that is formed on the intermediate transfer belt 14 is transferred by the secondary transfer backup roller 12 and the secondary transfer roller 18 from the intermediate transfer belt 14 onto the printing medium and printing is performed on the printing medium. The printer engine 103 counts the number of prints obtained by performing printing.

On being notified by the image processor 102 of the completion of transfer of the printing data at step S124, the correction processor 101 notifies the printer controller 100 of completion of transfer of the printing data (step S126). On being notified by the conveyance unit 104 of ejection of the printing medium on which printing has been performed, the printer engine 103 notifies the printer controller 100 of completion of the printing (step S127).

Figure 6:
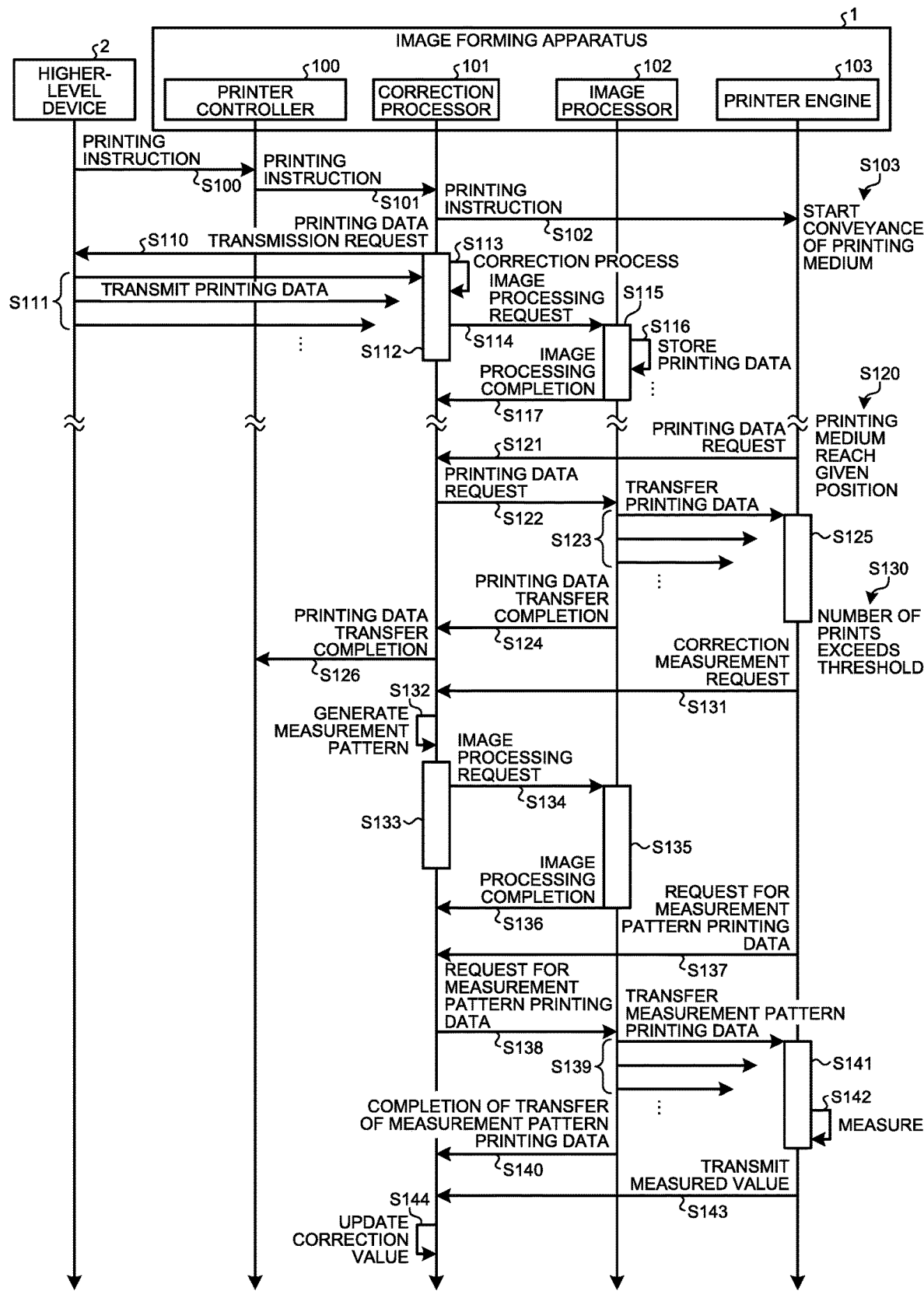
FIG. 6 is a sequence chart of exemplary operations of a process of updating a concentration correction value according an existing technology.

The process of updating the concentration correction value according to an existing technology will be described. FIG. 6 is a sequence chart of exemplary operations of the process of updating the concentration correction value according to the existing technology. According to the existing technology, when the image forming apparatus 1 executes a given amount of printing after the previous process of updating the concentration correction value is performed, the image forming apparatus 1 requests updating the concentration correction value.

The process of steps S100 to S126 in FIG. 6 is the same process as that of steps S100 to S126 described using FIG. 5 and thus descriptions thereof will be omitted. Based on the number of prints of printing media that is counted at step S125, the printer engine 103 performs threshold determination on the number of prints from the previous update of the concentration correction value (step S130). When it is determined that the number of prints exceeds the threshold that is set previously for the number of prints, the printer engine 103 requests the correction processor 101 to perform measurement for concentration correction (step S131).

In association with the measurement request at step S131, the printer engine 103 starts preparation for concentration measurement. The preparation for concentration measurement, for example, may include initialization of the read unit 103a (the sensor 17) and a request for the conveyance unit 104 to set an interval between printing media for transfer of the measurement pattern onto the intermediate transfer belt 14.

In response to the measurement request from the printer engine 103, the correction processor 101 starts generating measurement pattern printing data for performing concentration correction (step S132). The correction processor 101 sequentially transmits the generated measurement pattern printing data as normal printing data to the image processor 102 (step S133). The correction processor 101 requests the image processor 102 to perform image processing on the transmitted measurement pattern printing data (step S134).

In response to the request for the correction processor 101 to perform image processing, the image processor 102 performs image processing, such as edge processing, on the measurement pattern printing data, which is transmitted from the correction processor 101, as in normal printing operations and accumulates the measurement pattern printing data on which the image processing has been performed in the buffer memory of the image processor 102 (step S135). On completing the image processing that is requested by the correction processor 101, the image processor 102 notifies the correction processor 101 of the completion (step S136).

On completing preparation for concentration measurement, the printer engine 103 notifies the correction processor 101 of a request for measurement pattern printing data (step S137). On receiving the notification, the correction processor 101 notifies the image processor 102 of the request for measurement pattern printing data as in requesting printing data in normal printing (step S138). The image processor 102 sequentially transmits the measurement pattern printing data that is accumulated at step S135 to the printer engine 103 (step S139). On completing transfer of the measurement pattern printing data that is requested by the correction processor 101 at step S134, the image processor 102 notifies the correction processor 101 of the completion (step S140).

On the other hand, when transfer of the measurement pattern printing data is completed, the printer engine 103 forms a measurement pattern on the intermediate transfer belt 14 based on the measurement pattern printing data (step S141). The measurement pattern is read by the sensor 17. Based on the result of reading by the sensor 17, the printer engine 103 measures the concentration of the measurement pattern that is formed on the intermediate transfer belt 14, using the read unit 103a (step S142). The printer engine 103 notifies the correction processor 101 of a measured value obtained by measuring the concentration of the measurement pattern (step S143).

The correction processor 101 performs computation based on the measured value of which the correction processor 101 is notified by the printer engine 103 to calculate a new correction value. The correction processor 101 rewrites the correction value that is stored in the memory 1001 with the calculated new correction value to update the correction value (step S144). The updated correction value is read by the correction processor 101 from the memory 1001 and is then stored in the buffer memory of the correction value storage 1012.

Printing Process According to Embodiment

The printing process according to the embodiment will be described. Assume that, in the correction process according to the conventional technology that has been described using FIG. 6, the timing of updating the correction value by steps S131 to S144 is incidentally after the last page of the printing job is printed and then printing is not performed for a while. Even in such a case, when it is determined at step S130 that the number of prints after the previous update of the correction value does not exceed the threshold, the process of updating the correction value represented at and after step S131 in FIG. 6 is not executed. When printing is restarted after a given time elapses with the condition where, after completion of printing the last page according to the printing job, printing is not executed, the condition of the image forming apparatus 1 may differ from that on update of the correction value. In this case, the correction process is not executed correctly and this makes it difficult to execute printing at an appropriate concentration.

In the embodiment, for a printing instruction, determination is performed based on a given condition before a printing process corresponding to the printing instruction is started and, when it is determined that the condition is met, the printing process is suspended and the process of updating the correction value based on a measurement pattern is executed. Accordingly, the timing of updating the correction value is after the last page in the printing job is printed and then, even when printing is not performed for a while, it is possible to execute the process of updating the correction value and execute image formation at an appropriate concentration.

In the embodiment, a measurement pattern preparation request for requesting preparation for a measurement pattern is added to the above-described conventional technology. This shortens the time required for the process of updating the correction value.

Figure 7:
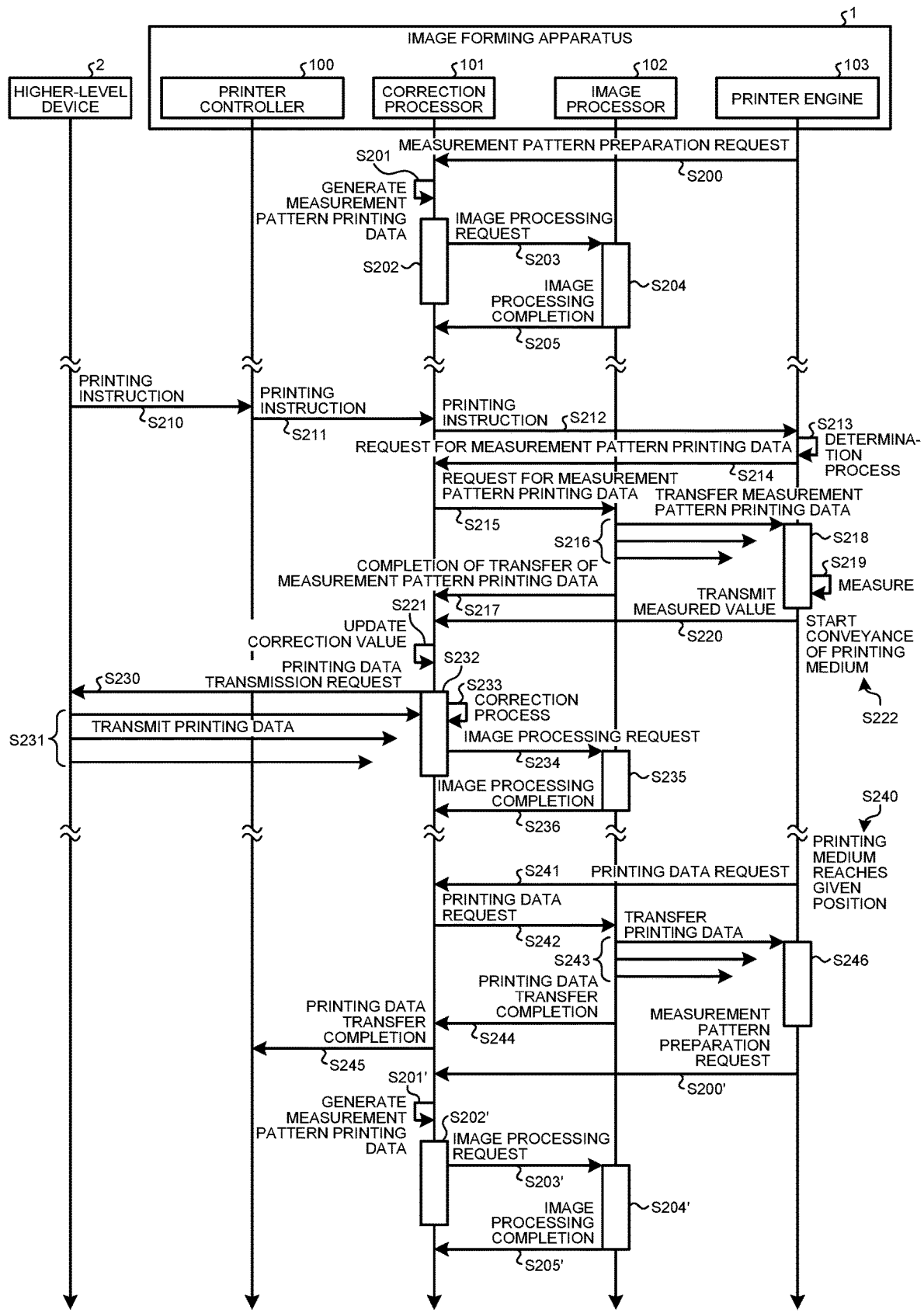
FIG. 7 is a sequence chart of exemplary operations of a printing process according to the embodiment.

FIG. 7 is an sequence chart of exemplary operations of the printing process according to the embodiment. For example, in response to start of the printer engine 103, the printer engine 103 notifies the correction processor 101 of a measurement pattern preparation request (step S200). The printer engine 103 is, for example, started in association with power-on of the image forming apparatus 1.

In response to the measurement pattern preparation request from the printer engine 103, the correction processor 101 starts generating measurement pattern printing data for forming a measurement pattern (step S201). The correction processor 101 sequentially transmits the generated measurement pattern printing data as normal printing data to the image processor 102 (step S202). The correction processor 101 requests the image processor 102 to perform image processing on the transmitted measurement pattern printing data (step S203).

In response to the image processing request from the correction processor 101, the image processor 102 performs image processing, such as edge processing, on the measurement pattern printing data that is transmitted from the correction processor 101 as in normal printing operations and accumulates the measurement pattern printing data on which the image processing has been performed as measurement pattern printing data in the buffer memory of the image processor 102 (step S204). In other words, the buffer memory of the image processor 102 functions as a measurement pattern storage that stores the measurement pattern printing data. When the image processing that is requested by the correction processor 101 is completed, the image processor 102 notifies the correction processor 101 of the completion (step S205).

As described above, for example, in response to the start of the printer engine 103, in the process of steps S200 to S205, the measurement pattern printing data for measuring a concentration is buffered in the buffer memory of the image processor 102.

After the printer engine 103 is started, the higher-level device 2 notifies the image forming apparatus 1 of a printing instruction at given timing (step S210). The higher-level device 2 notifies the image forming apparatus 1 of a printing instruction to perform printing based on printing data of a size of one page among pages contained in a printing job. In the image forming apparatus 1, on receiving the printing instruction from the higher-level device 2, the printer controller 100 notifies the correction processor 101 of the printing instruction (step S211).

The correction processor 101 notifies the printer engine 103 of the printing instruction (step S212). On receiving the notification, the printer engine 103 stores the time when the notification is received with the timer and stores the measured time in the memory.

In response to the notification indicating the printing instruction at step S212, the printer engine 103 determines whether the timing of reception of the notification indicating the printing instruction meets the given condition (step S213). The given condition for the printer engine 103 to perform determination includes the following two conditions: Condition (1) and Condition (2).

Condition (1): the printing instruction on which determination is to be performed is the first printing instruction after the printer engine 103 is started.

Condition (2): the printing instruction on which determination is to be performed is a printing instruction that is received after a time of a threshold that is set for time after printing corresponding to the printing instruction that is previously received is completed.

When it is determined at step S213 that the printing instruction of which the printer engine 103 is notified at step S212 meets the above-described Condition (1) or Condition (2), the printer engine 103 suspends the printing instruction of which the printer engine 103 is notified at step S212 and notifies the correction processor 101 of a request for measurement pattern printing data (step S214). In other words, the notification is a notification of a request from the printer engine 103 for the correction processor 101 to update the correction value for performing concentration correction. Suspension of the printing instruction, for example, refers to an operation of temporarily stopping the process corresponding to the printing instruction.

At step S213, when it is determined that the printing instruction of which the printer engine 103 is notified at step S212 does not meet any one of the above-described Condition (1) and Condition (2), as described in detail below, execution of a concentration measurement process is canceled.

On receiving the notification indicating the request for measurement pattern printing data at step S214, the correction processor 101 executes the process of updating the correction value according to steps S215 to S221 as according to steps S138 to S144 in FIG. 6.

In other words, the correction processor 101 notifies the image processor 102 of a request for measurement pattern printing data as in requesting printing data in normal printing (S215). In response the notification indicating the request for measurement pattern printing data, the image processor 102 sequentially transmits the measurement pattern printing data that is accumulated at step S204 described above to the printer engine 103 (step S216). On completion of transfer of measurement pattern printing data that is requested by the correction processor 101, the image processor 102 notifies the correction processor 101 of the completion (step S217).

On the other hand, when transfer of the measurement pattern printing data is completed, the printer engine 103 forms a measurement pattern on the intermediate transfer belt 14 based on the measurement pattern printing data (step S218). The measurement pattern is read by the sensor 17. Using the read unit 103a, the printer engine 103 measures the concentration of the measurement pattern that is formed on the intermediate transfer belt 14 based on the result of the reading by the sensor 17 (step S219) and notifies the correction processor 101 of the measured value (step S220).

The correction processor 101 performs computation based on the measured value of which the correction processor 101 is notified by the printer engine 103 to calculate a new correction value. The correction processor 101 rewrites the correction value that is stored in the memory 1001 with the calculated new correction value to update the correction value (step S221). The updated correction value is read by the correction processor 101 from the memory 1001 and is then stored in the buffer memory of the correction value storage 1012.

After updating the correction value at step S221, the correction processor 101 cancels the suspension of the printing instruction of which the printer engine 103 is notified at step S212 and, based on the printing instruction, requests the higher-level device 2 to transmit printing data (step S230). Printing process based on the printing data is then executed according to the process of steps S231 to S246 as according to steps S111 to S126 in FIG. 5.

In other words, the higher-level device 2 that receives the printing data transmission request transmits printing data to the correction processor 101 (step S231). While receiving the printing data sequentially from the higher-level device 2 (step S232), the correction processor 101 performs the concentration correction process on the received printing data based on the correction value that is stored in the correction value storage 1012 (step S233). The correction value storage 1012 stores the correction value that is updated at step S221 described above. The correction processor 101 is able to execute concentration correction on the printing data using the updated correction value.

The correction processor 101 transmits the printing data on which the concentration correction process has been performed to the image processor 102 and requests the image processor 102 to perform image processing (step S234). In response to the request, the image processor 102 performs image processing on the printing data on which the concentration correction process has been performed (step S235) and accumulates the printing data on which the image processing has been performed in the internal buffer memory of the image processor 102. When the image processing that is requested by the correction processor 101 is completed, the image processor 102 notifies the correction processor 101 of the completion (step S236).

On the other hand, for example, when the measured value is transmitted at step S220, the printer engine 103 transmits a conveyance instruction to the conveyance unit 104 according to the content of the printing instruction of which the printer engine 103 is notified at step S212 to start conveyance of a printing medium from the paper feeding device 19 (step S222).

On being notified by the conveyance unit 104 that the conveyed printing medium reaches a given position (step S240), the printer engine 103 notifies the correction processor 101 of a printing data request (step S241). In response to the notification, the correction processor 101 notifies the image processor 102 of the printing data request (S242). In response to the notification, the image processor 102 sequentially transmits, to the printer engine 103, printing data on which image processing has been performed and that is accumulated at step S236 (step S243).

When transfer of the printing data that is requested by the correction processor 101 at step S242 is completed, the image processor 102 notifies the correction processor 101 of the completion (step S244). On receiving the notification at step S244, the correction processor 101 notifies the printer controller 100 of completion of transfer of the printing data (step S245). When transfer of the printing data from the image processor 102 is completed, the printer engine 103 performs printing on the printing medium based on the printing data (step S246).

When printing corresponding to the printing instruction at step S212 is completed (step S246), the printer engine 103 notifies the correction processor 101 of a measurement pattern preparation request (step S200').

Thereafter, as in the process of steps S201 to S205 described above, generation and accumulation of measurement pattern printing data are executed. In other words, in response to a measurement pattern preparation request at step S200', the correction processor 101 starts generating measurement pattern printing data (step S201') and sequentially transmits generated measurement pattern printing data as normal printing data to the image processor 102 (step S202'). The correction processor 101 requests the image processor 102 to perform image processing on the transmitted measurement pattern printing data (step S203'). In response to the request for image processing from the correction processor 101, the image processor 102 performs image processing on the measurement pattern printing data that is transmitted from the correction processor 101 as in normal printing operations and accumulates the measurement pattern printing data on which image processing has been performed in the buffer memory of the image processor 102 (step S204'). When the image processing that is requested by the correction processor 101 is completed, the image processor 102 notifies the correction processor 101 of the completion (step S205').

Even when the elapsed time from the correction value updating process according to steps S215 to S221 corresponding to the current printing instruction until the determination process corresponding to the next printing instruction (step S213) exceeds the threshold that is set in advance for time, the process of steps S200' to S205' enables execution of the process of updating the correction value in a short time.

In the embodiment, as illustrated in the sequence of FIG. 7, in response to reception of the printing instruction, when any one of Condition (1) and Condition (2) described above is met, the process of updating the correction value used for concentration correction is executed. Thus, even when the characteristics of the image forming apparatus 1 that relate to printing vary from the previous update of the correction value, for example, right after the power of the image forming apparatus 1 is turned on or when printing is not executed for a long time, printing at an appropriate density is executable.

In the embodiment, when the power of the image forming apparatus 1 is turned on, measurement pattern printing data for measuring the concentration correction value in advance is generated and is stored in the image processor 102 and this makes it possible to shorten the time required for the concentration measurement process. Furthermore, in the embodiment, the printer engine 103 suspends the printing instruction from the higher-level device 2 and executes concentration correction and then restarts the printing process. Thus, right after the power of the image forming apparatus 1 is turned on or in printing after the condition where printing is not executed for a long time, it is possible to perform the concentration correction process based on an appropriate concentration correction value from the first print.

Figure 8:
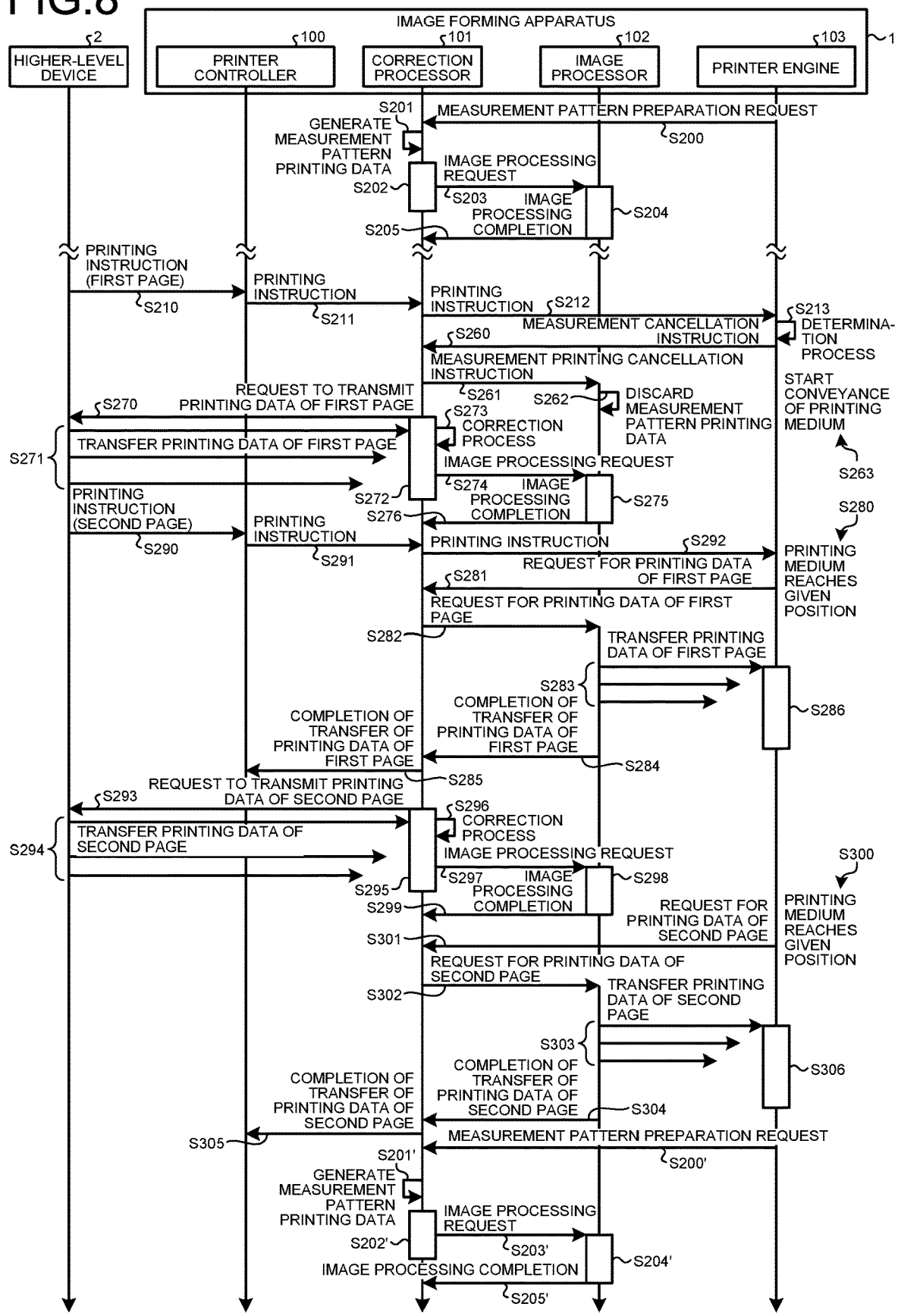
FIG. 8 is a sequence chart of exemplary operations of the printing process according to the embodiment.

FIG. 8 is a sequence chart of exemplary operations of a printing process according to the embodiment. FIG. 8 illustrates an example where a printing instruction does not satisfy any one of Condition (1) and Condition (2) in the determination process of step S213 in the sequence chart in FIG. 7 described above and execution of the concentration measurement process is canceled.

The process of steps S200 to S212 in FIG. 8 is the same as the process of steps S200 to S212 in FIG. 7 and descriptions thereof will be omitted. At step S213, when it is determined that the printing instruction of which the printer engine 103 is notified at step S212 does not satisfy any one of Condition (1) and Condition (2), the printer engine 103 notifies the correction processor 101 of a measurement cancellation instruction to cancel the concentration measurement process (step S260).

In response to the notification of the measurement cancellation instruction, the correction processor 101 notifies the image processor 102 of a measurement printing cancellation instruction to cancel printing the measurement pattern based on measurement pattern printing data (step S261). In response to the notification, the image processor 102 discards the measurement pattern printing data that is accumulated in the buffer memory of the image processor 102 at step S204 (step S262).

After notifying the image processor 102 of the measurement printing cancellation instruction, the correction processor 101 requests the higher-level device 2 to transmits printing data according to the printing instruction of which the correction processor 101 is notified (step S270). Thereafter, the printing process based on the printing data of the first page is executed according to the process of steps S271 to S281 as at steps S111 to S126 in FIG. 5.

The printing instruction of which the printer engine 103 is notified at step S212 is an instruction to print the first page of the printing job and execute printing the first page according to the process of steps S271 to S281.

The higher-level device 2 that receives a printing data transmission request transmits printing data of the first page to the correction processor 101 (step S271). While sequentially receiving the printing data of the first page from the higher-level device 2 (step S272), the correction processor 101 performs the concentration correction process on the received printing data based on the correction value that is stored in the correction value storage 1012 (step S273). In this case, the correction value that is stored in the correction value storage 1012 is not updated according to the printing instruction at step S212 and is, for example, the correction value that is updated according to the printing instruction before the current printing instruction.

The printing data on which the concentration correction process has been performed is transmitted from the correction processor 101 to the image processor 102 (step S274), the image processor 102 performs image processing on the printing data on which the concentration correction process has been performed, and the printing data on which the image processing has been performed is accumulated in the buffer memory in the image processor 102 (step S275). When the image processing that is requested by the correction processor 101 is completed, the image processor 102 notifies the correction processor 101 of the completion (step S276).

On the other hand, for example, when the printer engine 103 notifies the correction processor 101 of the measurement cancellation instruction at step S260, the printer engine 103 transmits a conveyance instruction to the conveyance unit 104 according to the content of the printing instruction of which the printer engine 103 is notified at step S212 to start conveyance of a printing medium from the paper feeding device 19 (step S263).

On being notified that the printing medium that is conveyed from the conveyance unit 104 reaches a given position (step S280), the printer engine 103 notifies the correction processor 101 of a printing data request for printing data of the first page (step S281). In response to the notification, the correction processor 101 notifies the image processor 102 of a printing data request for the printing data of the first page (S282). In response to the notification, the image processor 102 sequentially transmits, to the printer engine 103, printing data on which image processing has been performed and that is accumulated at step S275 (step S283).

On completing transfer of the printing data that is requested by the correction processor 101 at step S282, the image processor 102 notifies the correction processor 101 of the completion (step S284). On receiving the notification at step S284, the correction processor 101 notifies the printer controller 100 of completion of transfer of the printing data of the first page (step S285). When transfer of the printing data from the image processor 102 is completed, the printer engine 103 performs printing on the printing medium based on the printing data (step S286).

The higher-level device 2 is able to transmit a printing instruction to print the next page in the printing job, that is, the second page in this example to the image forming apparatus 1 at given timing after the printing instruction to print the first page (step S210). In the example illustrated in FIG. 8, the higher-level device 2 transmits a printing instruction to print the second page after transfer of the printing data of the first page at step S271 is completed (step S290).

The printer controller 100 notifies the correction processor 101 of the printing instruction to print the second page that is received from the higher-level device 2 (step S291). On receiving the notification, the correction processor 101 notifies the printer engine 103 of the printing instruction to print the second page (step S292). The printer engine 103 suspends the printing instruction to print the second page until the printing process according to the printing instruction to print the first page of which the printer engine 103 is already notified at step S212 ends.

On being notified of completion of transfer of the printing data of the first page at step S284, the correction processor 101 requests the higher-level device 2 to transmit printing data of the second page according to the printing instruction to print the second page of which the correction processor 101 is notified by the printer controller 100 at step S291 (step S293). While sequentially receiving the printing data of the second page that is transmitted from the higher-level device 2 in response to the request (step S294 and step S295), the correction processor 101 performs the concentration correction process on the received printing data based on the correction value that is stored in the correction value storage 1012 (step S296).

The printing data on which the concentration correction process has been performed is transmitted from the correction processor 101 to the image processor 102 where image processing is performed according to a notification indicating an image processing request (step S297 and step S298) and the printing data on which image processing has been performed is accumulated in the internal buffer memory of the image processor 102. When the image processing requested by the correction processor 101 is completed, the image processor 102 notifies the correction processor 101 of the completion (step S299).

On the other hand, on being notified that a printing medium from the conveyance unit 104 reaches a given position (step S300), the printer engine 103 notifies the correction processor 101 of a printing data request for printing data of the second page (step S301). In response to the notification, the correction processor 101 notifies the image processor 102 of a printing data request for the printing data of the second page (S302). In response to the notification, the image processor 102 sequentially transmits, to the printer engine 103, printing data on which image processing has been performed and that is accumulated at step S298 (step S303).

When transfer of the printing data that is requested by the correction processor 101 at step S303 is completed, the image processor 102 notifies the correction processor 101 of the completion (step S304). On receiving the notification, the correction processor 101 notifies the printer controller 100 of completion of transfer of the printing data of the second page (step S305). When transfer of the printing data from the image processor 102 is completed, the printer engine 103 performs printing on the printing medium based on the printing data (step S306).

In the sequence of step S210 and the following steps, the printer engine 103 is notified by the correction processor 101 of the printing instruction to print the second page before printing the first page (step S286) ends. In other words, in the above-described example, the printer engine 103 is notified of the printing instructions to print multiple images without interval in the printing operations of the printer engine 103.

On the other hand, in the above-described example, on completion of the printing process corresponding to the printing instruction to print the second page, the printer engine 103 is not notified of a printing instruction to print the next page (the third page). In this case, the image forming apparatus 1 according to the embodiment generates a measurement pattern for performing concentration measurement and stores the measurement pattern to prepare for the next update of the correction value.

In other words, in the image forming apparatus 1, as at steps S200 to S205 described above, for example, when the printer engine 103 is not notified of a printing instruction to print the next page (the third page) on the end of the process of printing the second page (step S306), the printer engine 103 notifies the correction processor 101 of a measurement pattern preparation request (step S200'). In response to the measurement patter preparation request, the correction processor 101 tarts generating measurement pattern printing data for forming a measurement pattern (step S201'). The correction processor 101 sequentially transmits the generated measurement pattern printing data as normal printing data to the image processor 102 (step S202') and requests the image processor 102 to perform image processing on the transmitted measurement pattern printing data (step S203').

In response to the request for image processing from the correction processor 101, the image processor 102 performs image processing as in normal printing operations on the measurement pattern printing data that is transmitted from the correction processor 101 (step S204') and accumulates the measurement pattern printing data on which image processing has been processed in the buffer memory of the image processor 102 (step S204). When the image processing that is requested by the correction processor 101 is completed, the image processor 102 notifies the correction processor 101 of the completion (step S205').

As described above, in the image forming apparatus 1 according to the embodiment, a cancellation instruction to cancel execution of the concentration measurement process is applied to the printing sequence. Thus, when the instruction signal from the higher-level device 2 is stopped, the printer engine 103 is able to notify the correction processor 101 of a measurement pattern preparation request to prepare a measurement pattern to perform concentration measurement and thus is able to deal with the situation where printing is not performed for a long time.

Figure 9:
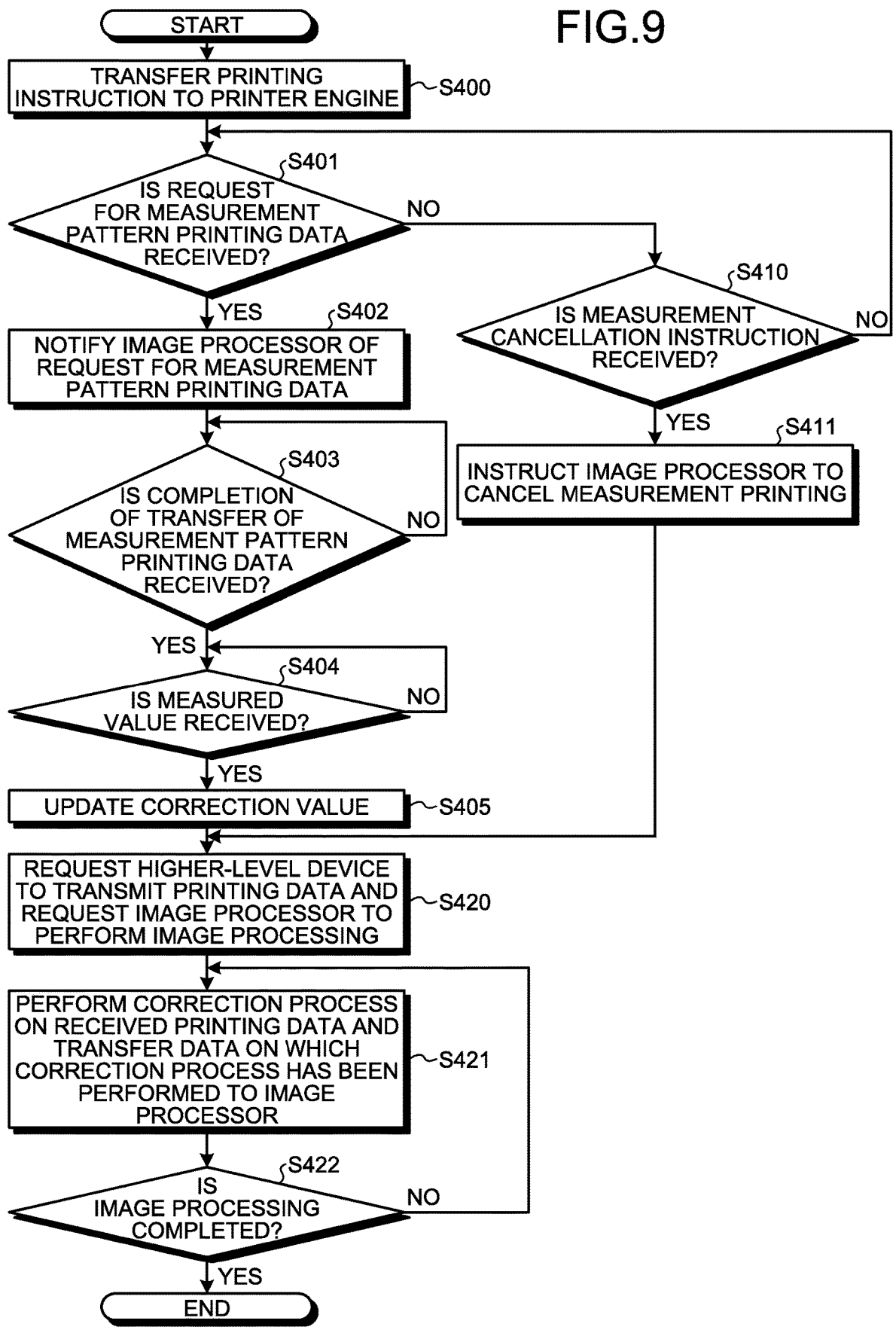
FIG. 9 is a flowchart of an exemplary process that is performed by the correction processor when the correction processor is notified of a printing instruction according to the embodiment.

The printing process according to the embodiment will be described more in detail using the flowcharts in FIGS. 9 to 12. FIG. 9 is a flowchart of an exemplary process that is performed by the correction processor 101 when the correction processor 101 is notified of a printing instruction. The flowchart in FIG. 9 represents a process corresponding to a printing instruction to print one page.

Prior to execution of the process of the flowchart in FIG. 9, the process of steps S200 to S205 in FIG. 7 or FIG. 8 is executed and measurement pattern printing data that is generated by the correction processor 101 is stored in the buffer memory of the image processor 102.

When notified by the printer controller 100 of a printing instruction, the correction processor 101 transfers the printing instruction to the printer engine 103 at step S400. At the following step S401, the correction processor 101 determines whether a request for measurement pattern printing data from the printer engine 103 is received. When it is determined that a request for measurement pattern printing data from the printer engine 103 is received ("YES" at step S401), the correction processor 101 shifts the process to step S402. At step S402, the correction processor 101 notifies the image processor 102 of a request for measurement pattern printing data. In response to the notification, the image processor 102 transfers measurement pattern printing data to the printer engine 103.

At the following step S403, the correction processor 101 determines whether a notification indicating completion of transfer of the measurement pattern printing data is received from the image processor 102. When it is determined that the notification is not received ("NO" at step S403), the correction processor 101 shifts the process to step S403. When it is determined that the notification is received ("YES" at step S403), the correction processor 101 shifts the process to step S404.

At step S404, the correction processor 101 determines whether a measured value is received from the printer engine 103. The measured value is a value that is output from the read unit 103a based on the read value that is obtained by the sensor 17 by reading an image of a measurement pattern that is transferred onto the intermediate transfer belt 14 based on the measurement pattern printing data in the printer engine 103. When it is determined that the measured value is not received ("NO" at step S404), the correction processor 101 returns the process to step S404. When it is determined that the measured value is received ("YES" at step S404), the correction processor 101 shifts the process to step S405.

At step S405, the correction processor 101 updates the existing correction value with the new correction value that is received at step S404. More specifically, for example, the correction processor 101 transmits the new correction value that is received at step S404 to the memory 1001 via the arbiter 1004 and rewrites the correction value that is stored in a given area of the memory 1001 with the new correction value to update the correction value. The correction processor 101 stores the updated corrected value in the buffer memory of the correction value storage 1012. After the correction value is updated, the correction processor 101 shifts the process to step S420.

When it is determined that a request for measurement pattern printing data is not received at step S401 ("NO" at step S401), the correction processor 101 shifts the process to step S410. At step S410, the correction processor 101 determines whether a notification indicating a measurement cancellation instruction is received from the printer engine 103. When it is determined that the notification is not received ("NO" at step S410), the correction processor 101 returns the process to step S401.

On the other hand, when it is determined that the notification indicating a measurement cancellation instruction is received ("YES" at step S410), the correction processor 101 shifts the process to step S411. At step S411, the correction processor 101 notifies the image processor 102 of a measurement printing cancellation instruction and shifts the process to step S420.

At step S420, the correction processor 101 requests the higher-level device 2 to transmit printing data. The correction processor 101 also requests the image processor 102 to perform image processing from.

At the following step S421, the correction processor 101 receives printing data that is transmitted from the higher-level device 2 in response to the request at step S420 and performs a correction process on the received printing data based on the correction value that is stored in the correction value storage 1012. The correction processor 101 transfers the corrected printing data to the image processor 102. At the following step S422, the correction processor 101 determines whether the image processing in the image processor 102 is completed, that is, whether a notification indicating completion of the image processing is received from the image processor 102. When it is determined that the notification is not received, the correction processor 101 returns the process to step S421. On the other hand, when it is determined that the notification is received, the correction processor 101 ends the process series in the flowchart in FIG. 9.

Figure 10:
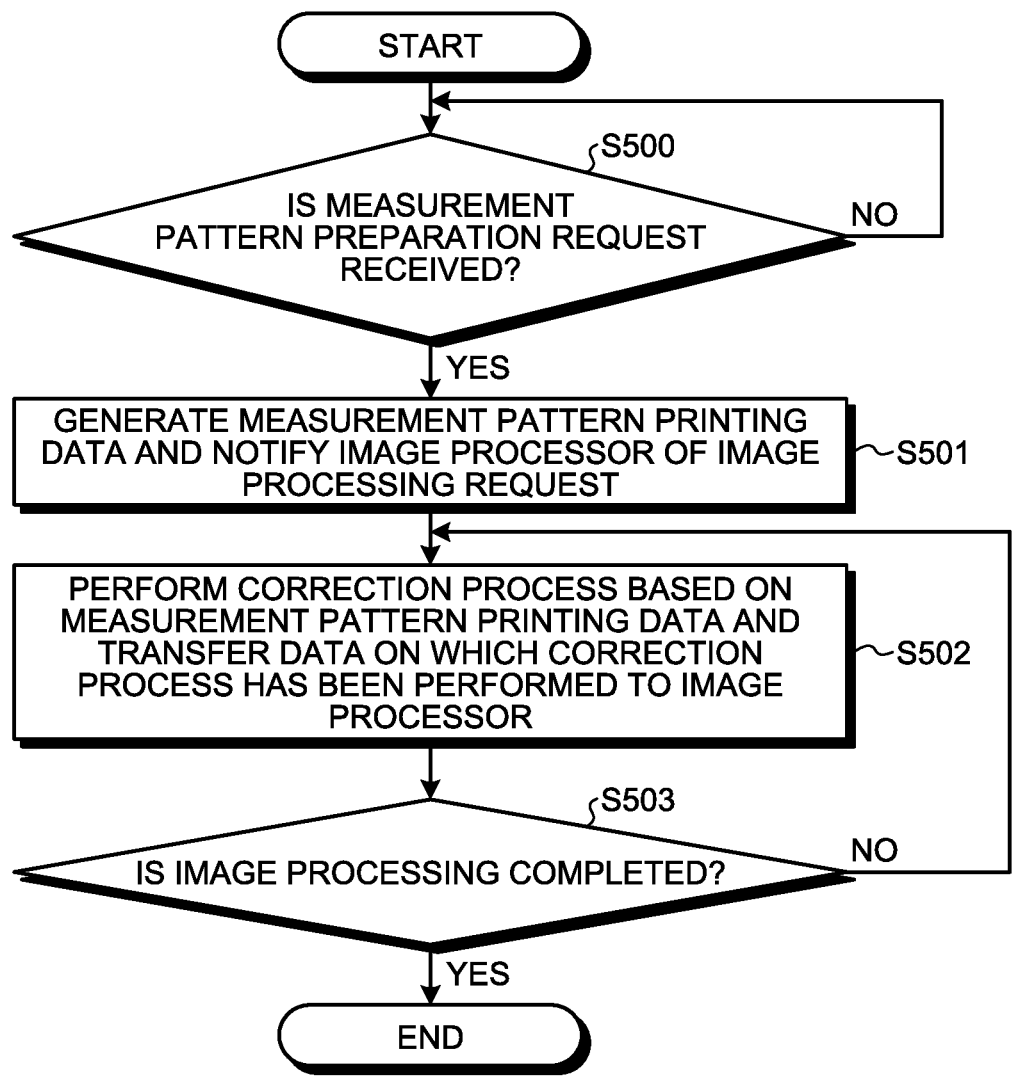
FIG. 10 is a flowchart of an exemplary process that is performed by the correction processor when the correction processor receives a notification indicating a measurement pattern preparation request according to the embodiment.

FIG. 10 is a flowchart of an exemplary process that is performed by the correction processor 101 when the correction processor 101 receives a notification indicating a measurement pattern preparation request according to the embodiment. As described above, the correction processor 101 receives the notification indicating the measurement pattern preparation request at step S200 or step S200' in FIG. 7 and FIG. 8.

At step S500, the correction processor 101 determines whether a notification indicating a measurement pattern preparation request is received from the printer engine 103. When it is determined that the notification is not received ("NO" at step S500), the correction processor 101 returns the process to step S500. When it is determined that the notification is received ("YES" at step S500), the correction processor 101 shifts the process to step S501.

At step S501, the correction processor 101 generates measurement pattern printing data for forming a measurement pattern. The correction processor 101 notifies the image processor 102 of an image processing request.

At step S502, the correction processor 101 performs the correction process on the generated measurement pattern printing data, using the correction value that is stored in the correction value storage 1012. The correction processor 101 transfers the measurement pattern printing data on which the correction process has been performed to the image processor 102. In response to the image processing request of which the image processor 102 is notified by the correction processor 101 at step S501, the image processor 102 performs the same image processing as that on normal printing data on the transferred measurement pattern printing data.

At the following step S503, the correction processor 101 determines whether a notification indicating that image processing on the measurement pattern printing data is completed is received from the image processor 102. When it is determined that the notification is not received ("NO" at step S503), the correction processor 101 returns the process to step S502. When it is determined that the notification is received ("YES" at step S503), the correction processor 101 ends the process series according to the flowchart in FIG. 10.

Figure 11:
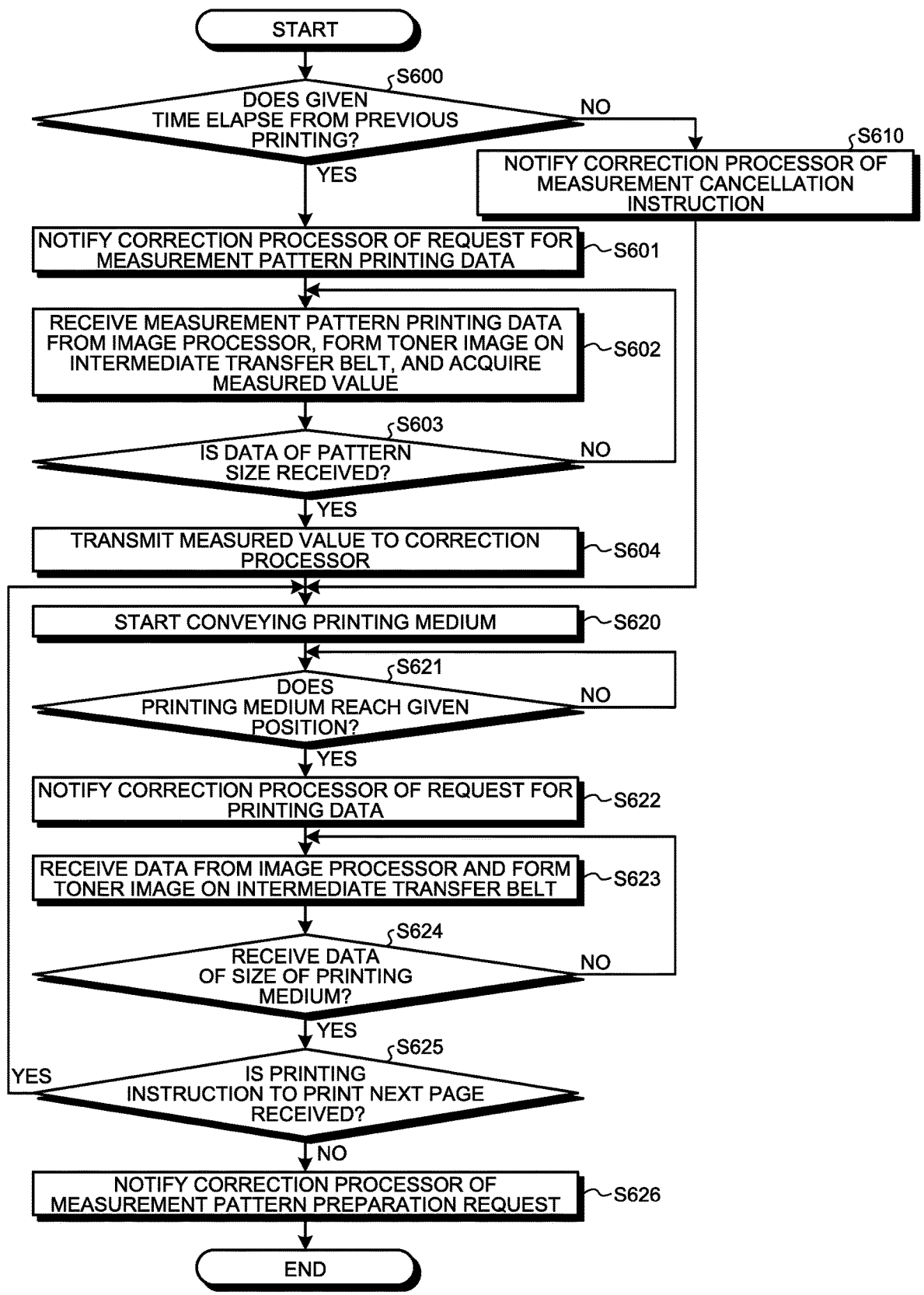
FIG. 11 is a flowchart of an exemplary process that is performed by a printer engine when the printer engine receives a notification indicating a printing instruction according to the embodiment.

FIG. 11 is a flowchart of an exemplary process that is performed by the printer engine 103 when the printer engine 103 receives a notification indicating a printing instruction. The flowchart in FIG. 11, for example, represents a process corresponding to a printing instruction to print one page. The process in FIG. 11 is started, for example, when the printer engine 103 receives a notification indicating a printing instruction from the correction processor 101 at step S212 in FIG. 7 or FIG. 8 or at step S292 in FIG. 8. The printer engine 103 stores the time when the notification indicating the printing instruction is received.

At step S600, the printer engine 103 determines whether the time from the previous completion of printing until the current reception of the printing instruction exceeds the threshold that is set in advance for time (whether a given time elapses after the previous printing). When it is determined that the threshold is not exceeded ("NO" at step S600), the printer engine 103 shifts the process to step S610. At step S610, the printer engine 103 notifies the correction processor 101 of a measurement cancellation instruction and shifts the process to step S620.

On the other hand, when it is determined that the elapsed time from completion of the previous printing to reception of the notification indicating the current printing instruction exceeds the threshold that is set in advance for time ("YES" at step S600), the printer engine 103 shifts the process to step S601. At step S601, the printer engine 103 notifies the correction processor 101 of a request for measurement pattern printing data.

At the following step S602, the printer engine 103 receives measurement pattern printing data from the image processor 102. The printer engine 103 sequentially forms a measurement pattern corresponding to the received measurement pattern printing data on the intermediate transfer belt 14. The formed measurement pattern is read by the sensor 17. In the printer engine 103, based on the result of reading by the sensor 17, the read unit 103a outputs a measured value corresponding to the concentration of the measurement pattern.

At the following step S603, the printer engine 103 determines whether measurement pattern printing data of a pattern size of the measurement pattern is received. When it is determined that the measurement pattern printing data of the pattern size of the measurement pattern is not received ("NO" at step S603), the printer engine 103 returns the process to step S602. On the other hand, when it is determined that the measurement pattern printing data of the pattern size of the measurement pattern is received ("YES" at step S603), the printer engine 103 shifts the process to step S604 and transmits a measured value obtained by measuring the concentration of the measurement pattern to the correction processor 101. After transmitting the measured value, the printer engine 103 shifts the process to step S620.

At step S620, the printer engine 103 transmits a conveyance instruction to the conveyance unit 104 to start conveyance of a printing medium. At the following step S621, the printer engine 103 determines whether the printing medium reaches a given position. More specifically, the printer engine 103 determines whether there is a notification indicating that the printing medium reaches the given position from the conveyance unit 104. When it is determined that the printing medium does not reach the given position ("NO" at step S621), the printer engine 103 returns the process to step S621.

On the other hand, when it is determined that the printing medium reaches the given position ("YES" at step S621), the printer engine 103 shifts the process to step S622. At step S622, the printer engine 103 notifies the correction processor 101 of a request for printing data.

At the following step S623, the printer engine 103 receives printing data from the image processor 102 and forms an image on the intermediate transfer belt 14 based on the received printing data. At the following step S624, the printer engine 103 determines whether printing data of a size of a printing medium is received. When it is determined that printing data of a size of a printing medium is not received ("NO" at step S624), the printer engine 103 returns the process to step S623.

At S624, when it is determined that printing data of a size of the printing medium is received from the image processor 102 ("YES" at step S624), the printer engine 103 shifts the process to step S625. At step S625, the printer engine 103 determines whether a printing instruction to print the next page is received from the correction processor 101. When it is determined that a printing instruction to print the next page is received ("YES" at step S625), the printer engine 103 returns the process to step S620.

When it is determined at step S625 that a printing instruction to print the next page is not received ("NO" at step S625), the printer engine 103 shifts the process to step S626. At step S626, the printer engine 103 notifies the correction processor 101 of a measurement pattern preparation request.

After the process of step S626, the printer engine 103 ends the process series according to the flowchart in FIG. 11.

Figure 12:
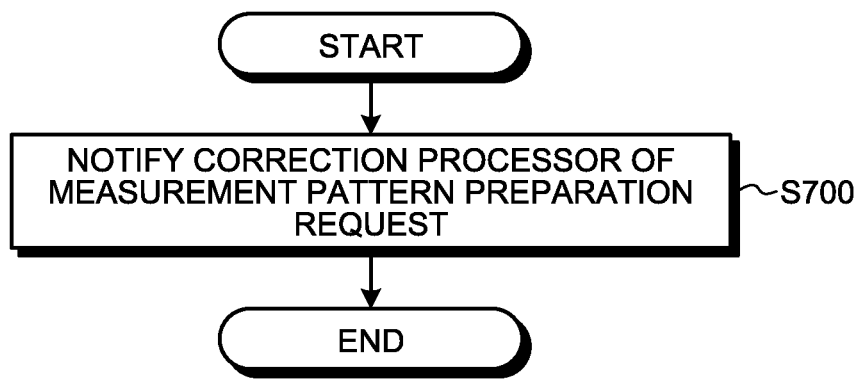
FIG. 12 is a flowchart of an exemplary process that is performed by the printer engine when the printer engine is started according to the embodiment.

FIG. 12 is a flowchart of an exemplary process that is performed by the printer engine 103 when the printer engine 103 is started according to the embodiment. For example, the printer engine 103 is started when the power of the image forming apparatus 1 is turned on. Furthermore, the time when the printer engine 103 is started may include the time when the printer engine 103 is started independently, for example, when the printer engine 103 returns from a power-saving mode.

When started, the printer engine 103 notifies the correction processor 101 of a measurement pattern preparation request according to step S700 (see step S200 in FIG. 7 or FIG. 8). When the process of step S700 ends, the process series according to the flowchart in FIG. 12 ends. After the process according to the flowchart in FIG. 12 ends, the printer engine 103 waits for a notification indicating a printing instruction from the correction processor 101.

As described above, in the image forming apparatus 1 according to the embodiment, the printer engine 103 determines whether to execute concentration measurement using the measurement pattern based on whether the elapsed time from completion of the previous printing until reception of the notification indicating the current printing instruction exceeds the threshold. Thus, appropriate image formation is enabled in image formation operations after the image forming apparatus 1 is left for a long time.

The embodiments described above are exemplary preferred modes of the invention; however, embodiments are not limited to this and various modifications may be made within the scope of the invention.

An embodiment produces an effect that appropriate image formation is enabled after a long time elapses from the previous image formation operations.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:
a correcting circuitry to correct, based on a correction value, printing data that is acquired according to a printing instruction transmitted from a higher-level device;
a correction value storage to store a correction value; and
an image forming circuitry that includes a measurement pattern storage, wherein
the correcting circuitry is configured to generate measurement pattern printing data in response to power-on of the image forming apparatus, and to store the measurement pattern printing data in the measurement pattern storage,
the image forming circuitry is configured, in response to reception of a latest printing instruction, to measure an elapsed time after completion of image formation according to a previous printing instruction and the reception of the latest printing instruction, wherein the previous printing instruction and the latest printing instruction are successive after the power-on of the image forming apparatus, and to determine if the elapsed time exceeds a threshold,
the image forming circuitry is configured, in response to the elapsed time exceeding the threshold, to suspend the latest printing instruction, to form a test image based on the measurement pattern printing data having been stored in the measurement pattern storage, and to request that the correcting circuitry update the correction value stored in the correction value storage based on the test image,
the correcting circuitry is configured to update the correction value in response to the request, to cancel the suspension of the latest printing instruction, and to correct printing data of the latest printing instruction by using the updated correction value, and
the image forming circuitry is configured to form an image based on the printing data corrected by the updated correction value.

2. The image forming apparatus according to claim 1, wherein, when it is determined that the elapsed time does not exceed the threshold, the image forming circuitry notifies the correcting circuitry that updating the correction value is to be canceled and executes formation of the image according to the latest printing instruction.

3. The image forming apparatus according to claim 1, wherein
the correcting circuitry generates the measurement pattern printing data in response to a request from the image forming circuitry and stores the measurement pattern printing data in the measurement pattern storage, and
when the image forming circuitry is started, or when a subsequent printing instruction is not received from the higher-level device after forming the image based on the printing data, the image forming circuitry requests the correcting circuitry to generate the measurement pattern printing data.

4. The image forming apparatus of claim 1, wherein:
the image forming circuitry is configured, in response to the elapsed time not exceeding the threshold, to form the image based on the printing data corrected by the correction value.

5. A non-transitory computer-readable recording medium that contains a control program that causes a computer to control an image forming apparatus in which the control program is installed, the control program causing the computer to perform a process comprising:
generating measurement pattern printing data in response to a power-on of the image forming apparatus;
storing the measurement pattern printing data in a measurement pattern storage;
receiving a latest printing instruction from a higher-level device to form an image based on printing data;
storing a correction value;
measuring an elapsed time from completion of image formation according to a previous printing instruction and a reception of the latest printing instruction, wherein the previous printing instruction and the latest printing instruction are successive after the power-on of the image forming apparatus;
determining if the elapsed time exceeds a threshold;
in response to determining that the elapsed time exceeds the threshold, performing steps of:
suspending the latest printing instruction;
forming a test image based on the measurement pattern printing data having been stored in the measurement pattern storage;
updating the correction value based on the test image;
correcting the printing data of the latest printing instruction based on the updated correction value; and
forming the image based on the printing data as corrected by the update correction value.

6. The non-transitory computer-readable recording medium of claim 5, wherein the control program causes the computer to perform the process comprising:
forming an image based on the printing data corrected by the correction value in response to the elapsed time not exceeding the threshold.

7. An image forming system comprising:
an image forming apparatus; and
a higher-level device that is connected to the image forming apparatus, wherein
the higher-level device is configured to transmit a printing instruction and printing data to the image forming apparatus, and
the image forming apparatus including:
a correcting circuitry to correct, based on a correction value, a printing data of a printing instruction from the higher-level device;
a correction value storage to store a correction value; and
an image forming circuitry that includes a measurement pattern storage,
the correcting circuitry is configured to generate measurement pattern printing data in response to a power-on of the image forming apparatus, and to store the measurement pattern printing data in the measurement pattern storage,
the image forming circuitry is configured, in response to a reception of a latest printing instruction, to measure an elapsed time from completion of image formation according to a previous printing instruction and the reception of the latest printing instruction, wherein the previous printing instruction and the latest printing instruction are successive after the power-on of the image forming apparatus, and to determine if the elapsed time exceeds a threshold,
the image forming circuitry is configured, in response to the elapsed time exceeding the threshold, to suspend the latest printing instruction, to form a test image based on the measurement pattern printing data having been stored in the measurement pattern storage, and to request that the correcting circuitry update the correction value stored in the correction value storage based on the test image,
the correcting circuitry is configured to update the correction value in response to the request, to cancel the suspension of the latest printing instruction, to correct printing data of the latest printing instruction by using the updated correction value, and
the image forming circuitry is configured to form an image based on the printing data corrected by the updated correction value.

8. The image forming system of claim 7, wherein:
the image forming circuitry is configured, in response to the elapsed time not exceeding the threshold, to form the image based on the printing data corrected by the correction value.

* * * * *